(12) United States Patent
Santarén Romé et al.

(10) Patent No.: US 9,447,283 B2
(45) Date of Patent: Sep. 20, 2016

(54) METHOD FOR PRODUCING A COMPOUND BASED ON PSEUDOLAMINAR SILICATES AND THE USE THEREOF AS A FILLER FOR POLYMERIC MATERIALS

(75) Inventors: Julio Santarén Romé, Madrid (ES); Eduardo Aguilar Díez, Madrid (ES); Antonio Esteban Cubillo, Madrid (ES); Antonio Álvarez Berenguer, Madrid (ES); Esperanza Benito Cano, Madrid (ES); Nuria García García, Madrid (ES); Julio Guzmán Perote, Madrid (ES); Pilar Tiemblo Magro, Madrid (ES)

(73) Assignee: TOLSA, S.A., Madrid (ES)

( * ) Notice: Subject to any disclaimer, the term of this patent is extended or adjusted under 35 U.S.C. 154(b) by 553 days.

(21) Appl. No.: 13/976,641

(22) PCT Filed: Jan. 30, 2012

(86) PCT No.: PCT/ES2012/070051
§ 371 (c)(1),
(2), (4) Date: Oct. 1, 2013

(87) PCT Pub. No.: WO2012/104460
PCT Pub. Date: Aug. 9, 2012

(65) Prior Publication Data
US 2014/0031455 A1 Jan. 30, 2014

(30) Foreign Application Priority Data
Feb. 1, 2011 (ES) .................................. 201130128

(51) Int. Cl.
*B02C 19/00* (2006.01)
*C09C 1/42* (2006.01)
(Continued)

(52) U.S. Cl.
CPC .............. *C09C 1/42* (2013.01); *B02C 19/0056* (2013.01); *C01B 33/44* (2013.01); *C08K 3/346* (2013.01);
(Continued)

(58) Field of Classification Search
CPC ..... B02C 19/00; B02C 19/0056; C09C 1/42; C08K 3/346; C08K 9/04; C01B 33/44; C01P 2004/04; C01P 2004/03; C01P 2006/12; C01P 2004/61
USPC ...................................................... 241/16, 21
See application file for complete search history.

(56) References Cited

U.S. PATENT DOCUMENTS

2008/0287586 A1  11/2008  Jones et al.
2010/0324195 A1  12/2010  Williamson

FOREIGN PATENT DOCUMENTS

CN       10123210       7/2008
ES       2 202 483      4/2004

OTHER PUBLICATIONS

International Search Report issued Apr. 12, 2012 in International (PCT) Application No. PCT/ES2012/070051.
(Continued)

*Primary Examiner* — Mark Rosenbaum
(74) *Attorney, Agent, or Firm* — Wenderoth, Lind & Ponack, L.L.P.

(57) ABSTRACT

The present invention relates to a method for producing a compound that comprises a pseudolaminar silicate of natural origin, which is at least one clay of the paligorskite-sepiolite group, characterized in that said method comprises the following steps: defibrillating the microfiber bundles of the at least one clay in water; dispersing the defibrillated clay in an organic or inorganic liquid solvent until a stable gel is formed; adding to the dispersion at least one clay-surface-modifying agent; removing the solvent from the dispersion by means of a solid-liquid separation process and/or drying process; and deagglomerating the final compound until a powdered product is obtained. A further object of the present invention is the compound that can be obtained using said method, as well as the use of the compound as an additive or filler in composite polymeric materials in order to enhance the properties thereof, the composite polymeric material likewise being encompassed within the present invention.

40 Claims, 6 Drawing Sheets

(51) Int. Cl.
*C01B 33/44* (2006.01)
*C08K 3/34* (2006.01)
*C08K 9/04* (2006.01)

(52) U.S. Cl.
CPC ............ *C08K 9/04* (2013.01); *C01P 2004/03* (2013.01); *C01P 2004/04* (2013.01); *C01P 2004/61* (2013.01); *C01P 2006/12* (2013.01)

(56) References Cited

OTHER PUBLICATIONS

C. Hongxiang et al., "Influence of organic modification on the structure and properties of polyurethane/sepiolite nanocomposites", Materials Science and Engineering, vol. 528, pp. 1656-1661, Nov. 25, 2011.

a)

b)

METHOD FOR PRODUCING A COMPOUND BASED ON PSEUDOLAMINAR SILICATES AND THE USE THEREOF AS A FILLER FOR POLYMERIC MATERIALS

TECHNICAL FIELD OF THE INVENTION

The present invention refers to obtaining compounds comprising clays of natural origin, namely pseudolaminar silicates of the palygorskite-sepiolite group, wherein the clay is in the form of individual discrete and superficially modified particles for its use as an additive or filler in composite polymeric materials for enhancing their properties.

STATE OF THE ART PRIOR TO THE INVENTION

The special clays, pertaining to the laminar phyllosilicate group, such as montmorillonite, are used as rheological additives given their capacity to modify the rheological behavior or the flow behavior of various liquid systems, when they are added in relatively low concentrations. In this way, these clays are used as thickening agents, in order to increase the system's viscosity, as a suspension agent, in order to prevent the sedimentation of the suspended particles in the system. They are also used as additives, which provide a particular rheological behavior, for example pseudoplasticity (viscosity reduction with shear velocity) or thixotropy (viscosity reduction over shear time, for a constant shear stress velocity). The laminar clays, such as montmorillonite, are also usually used as filler for polymers, in order to enhance their mechanical resistance, their thermal resistance or to increase their resistance to the flame or to reduce their permeability to gases. The best enhancements are obtained when this filler has been dispersed until individualized laminar particles are obtained in the polymeric matrix, thanks to an exfoliation process of the sheets that form the microscopic structure of the montmorillonite. The individual laminar particles of the montmorillonite are approximately 1 nanometer thick. In order to achieve adequate dispersion of the laminar clays in the polymer, it is necessary to modify the clay surface using organic agents, usually of the quaternary ammonium salts variety, which facilitate making the hydrophilic clay surface compatible with the polymeric matrix, to a greater or lesser polarity grade (Ruiz-Hitzky, E. and Van Meerbeek A. (2006) Development in Clay Science: Chapter 10.3 Clay Mineral- and Organoclay-Polymer nanocomposite in Handbook of Clay Science. Bergaya F., Theng B. K. G., Lagaly G., eds. Elsevier, 583-621).

Other types of special clay commonly used as a rheological additive are sepiolite and attapulgite, also known as palygorskite. These two clays make up the pseudolaminar silicate group, also known as the palygorskite-sepiolite group, which is characterized in that the shape of the particles pertaining to this group are acicular rather than laminar, with a microfiber form with an average typical length of 1 to 2 μm and a diameter of 10 to 20 nanometers.

Chemically, sepiolite is a hydrated magnesium silicate although aluminum sepiolites (with approximately 19% of the octahedral positions occupied by aluminum ions), ferric sepiolites (referred to as xylotil), nickel-ferric Sepiolites (falcondoite) and sodium Sepiolites (loughlinite) also exist. Palygorskite or attapulgite are hydrated magnesium aluminum silicates, which have a similar structure to sepiolite. According to Brauner and Preisinger, sepiolite is structurally formed by talc type bands, comprising two layers of silica tetrahedral bound by oxygen atoms to a central layer of magnesium octahedra. These talc type bands are arranged in such a way that the silica tetrahedron layer is continuous but with the silica tetrahedra inverted every six units. This structure determines an acicular morphology in the sepiolite particles, elongated along the c axis and the presence of channels, referred to as zeolitics, which run in the direction of the c axis of the acicular particles, with dimensions of 3.7 Å×10.6 Å, into which water and other liquids may penetrate. Because of this structure, sepiolite has a very high, specific surface, owing not only to the elevated external surface but also to the internal surface originating from the zeolitic channels. The total theoretical surface of sepiolite, calculated based on structural models, is 900 $m^2/g$, 400 $m^2/g$, of which correspond to the external area and 500 $m^2/g$ of which correspond to the internal area. Nevertheless, not all the sepiolite surface is equally accessible to all of the molecules. The accessible surface of the sepiolite depends on the adsorbate used, on its size and polarity, which determine the accessibility of the adsorbate molecule to the clay micropores and the zeolitic channels. The BET surface accessible to $N_2$ is usually higher than 300 $m^2/g$, which is one of the highest surfaces for a natural mineral. Furthermore, on the surface of the sepiolite microfibers, there is a high density of silanol groups (Si—OH), which originate from the siloxane bonds Si—O—Si on the edges of the silicate structure. These silanol groups give the sepiolite surface a very hydrophilic nature and may form hydrogen bonds and absorb various kinds of polar molecules, such as alcohols, glycols and amines. The silanol groups may also react with various reactive groups, such as organosilane compounds, forming a covalent bond.

Attapulgite has a similar structure to sepiolite, although in this case the inversion of the silicon tetrahedrons occurs every four tetrahedrons, rather than every six, as in the case of sepiolite. Consequently, the zeolitic channels found in attapulgite have a 3.7 Å×6.4 Å section, smaller than that of the sepiolite channels. For this reason, the specific attapulgite surface, despite being high, is lower than that of sepiolite, its BET surface, $N_2$ being approximately 150 $m^2/g$.

The individual microfiber particles of sepiolite and attapulgite are found, in their natural state, bound together, forming large bundles of individual, acicular particles randomly arranged, with a structure analogous to that of a hay bale, in that they are bound closely together. The structure formed is very porous with a high volume of mesopores and macropores. By employing special grinding and micronization processes, such as those described in patent application EP-A-0170299, products with greater dispersion may be obtained, which are used as rheological additives. The thermal treatment of sepiolite and attapulgite, in order to eliminate the water absorbed on the surface and particularly, the water bound by hydrogen bonds to crystallization water molecules which complete the coordination of the magnesium atoms, in the case of sepiolite, or of magnesium and aluminum atoms, in the case of attapulgite, located at the edge of the structure, in both the internal zeolitic channels and in the open channels at the edge of the structure, also increases the absorption capacity of these clays.

These pseudolaminar silicates of acicular or microfiber morphology are not very common and the best known deposits currently being commercially exploited are located, in the case of sepiolite, in the Vallecas-Vicálvaro region of Madrid, Spain and, in the case of attapulgite, in Attapulgus (Georgia, US).

The structure of the sepiolite and attapulgite silicate has a much lower isomorphic substitution grade than in the case of montmorillonite, therefore its surface charge is much lower and its cation exchange capacity is also lower, in the range of 10 to 20 meq/100 g, in comparison to a typical value of 100 meq/100 g for montmorillonite. Consequently, sepiolite and attapulgite do not swell spontaneously in water as montmorillonite does. For this reason, the individual acicular sepiolite and attapulgite particles naturally appear in large groups or bundles of individual microfiber particles strongly bound together, making it necessary to subject them to dispersion processes by applying mechanical energy and using high shearing in order to deagglomerate the bundles into their individual particles. Furthermore, despite the lower cation exchange capacity of sepiolite and attapulgite in comparison to smectics, these clays are also modified organically in a traditional way, using quaternary ammonium salts, as usually used with laminar silicates, such as montmorillonite. Thus, cation exchange processes are usually used with these quaternary ammonium salts to modify sepiolite and attapulgite superficially, in order to obtain organophilic clay (Ruiz-Hitzky et al., 2006).

Patent application EP-A-0170299 describes a method for producing a rheological grade product of sepiolite, based on a process of wet micronization that makes it possible to obtain a product with enhanced dispersion in water, which is essential for its efficiency as a rheological additive.

For its part, patent EP0221225 describes a method for organically modifying the surface of sepiolite and attapulgite, making them organophilic, hence facilitating the effective use thereof in organic media having different polarity, by means of an impregnation method with modifying agents from the quaternary ammonium salts family.

Likewise, other patents aiming to obtain organophilic clays or organoclays may be found, specifically sepiolite or attapulgite, which have been modified based on different quaternary ammonium compounds. The purpose of the same is to make the silicate compatible for its application in various organic matrices. Henceforth, U.S. Pat. No. 6,635,108 describes modifying sepiolite and attapulgite by means of mixing a diluted aqueous solution of clay, which has been previously treated, with a quaternary ammonium salt.

On the other hand, U.S. Pat. No. 4,302,594 describes a method for producing sepiolite, which has been modified by silanes. It concerns the reaction to alkoxysilanes with the aim of improving the silicate's compatibility with polymers. Contact of both starting materials is performed, either by vaporizing the silane applying heat or by pulverizing the same with nitrogen, both processes being countercurrent.

Another way of obtaining organosepiolite modified with silanes is by subjecting the clay to a prior activation process [J. L. Valentin, M. A. López-Manchado, P. Posadas, A. Rodríguez, A. Marcos-Fernández, L. Ibarra, Colloid and Interface Science, February 2006, 794-804]. In this process, the sepiolite is treated with hydrochloric acid, thus producing silica, since this alters the structure of the clay (destroying the octahedral layer). Following this, said silica starts to be modified with silane in an organic solvent (toluene).

Nevertheless, the clay modification methods known in the field, present certain limiting disadvantages. The main disadvantage is that the sepiolite and attapulgite products obtained using these methods do not make it possible to obtain products with individual particles or individualized and modified microfibers, which, when they are incorporated or mixed in a polymeric matrix, are dispersed to the level of individual particles or microfibers homogeneously distributed in the polymeric matrix. On the contrary, with the modification processes employed to date, products composed of modified particles or bundles of micrometric fibers are obtained, which, when incorporated into polymer matrices, are not dispersed until individual particles or microfibers homogeneously distributed in the matrix are obtained. For example, in relation to the method for modifying clay with silanes, when an organic solvent with low polarity is used, in other words (as should be understood in the present specification by "low polarity"), solvents with a dielectric constant below 15 and, in particular, non-polar aprotic solvents of the aliphatic or aromatic hydrocarbon variety, it has been observed that sepiolite and attapulgite are not dispersed correctly in the organic medium due to the very hydrophilic surface of this type of clay. Thus, sepiolite and attapulgite microfibers are not dispersed and remain bound together, forming bundles of microfibers that are micrometric in size. Consequently, the organic modifier is attached to the external surfaces of the bundles and there is no good homogeneous coating on the surface of the elemental microfibers in these pseudolaminar silicates. Therefore, organically modified clays obtained are not adequately dispersed when incorporated into a polymer, for example. On the other hand, sepiolite and attapulgite, in contrast to montmorillonite and other smectic type laminar silicates, do not swell spontaneously in water and it is necessary to use high shear agitation and dispersion methods, such as high velocity mechanical agitators, capable of reaching a peripheral velocity exceeding 15 m/s, in order to achieve adequate dispersion of the fibrilar particles of these clays. If the clay does not undergo prior high shear preparation, the individual microfibers of these clays remain in micrometric bundle form, even when they are dispersed in an aqueous or organic medium with high polarity. As a result, the organic surface modifications they undergo, using for example quaternary ammonium salts or silane type modifiers, also gives rise to a change of the external surfaces of the bundles and a product is obtained, which is not modified homogeneously on and which is thus not adequately dispersed when incorporated into a polymeric matrix. Faced with this problem, the method of the present invention makes it possible to obtain defibrillated sepiolite and attapulgite products, which are modified homogenously at the surface and which, when incorporated into a polymer, make it possible to obtain a homogenous distribution of microfibers in the matrix. Moreover, the method of the present invention makes it possible to obtain defibrillated clay compounds, modified with more than one organic modifier, in order to enhance compatibility, dispersion and interaction in polymer matrices. In particular, at least two organic modifiers may be used: (1) one or more that enhance the compatibility and dispersion of the defibrillated clay compound in a polymeric matrix and (2) another/other modifier(s) with a group that can form a covalent bond with the clay surface and a second group, which can interact with the polymeric matrix, giving rise to enhanced dispersion of the clay and enhanced transfer of forces from the matrix to the clay, which in turn enhances the properties of the composite polymeric material significantly.

DESCRIPTION OF THE INVENTION

General Description

The main aim of the present invention is to provide an innovative and inventive compound, comprising at least one clay of natural origin, of the palygorskite-sepiolite pseudolaminar silicate group, obtained by means of a simple and inexpensive method, which is viable on an industrial scale, to be used as additive or inorganic filler in matrices or composite polymeric materials. The preparation method consists essentially in modifying the surface of an inorganic material with at least one modifying agent, wherein the inorganic material is at least one of the pseudolaminar silicates mentioned and the at least one modifying agent is a chemical compound or molecule, with one portion (of the molecule) that is capable of interacting and binding to the clay surface and another organic portion, with more hydrophobic characteristics than the clay surface, which is exposed to the exterior of the clay surface in order to make it compatible with organic compounds and polymers, particularly those of low polarity. Typical examples of modifying agents include amphiphilic or amphiphatic molecules formed by a hydrophilic end and a hydrophobic end. The compound, object of the invention and based on a pseudolaminar silicate, which is at least one clay of natural origin, is obtained using a method that comprises at least the following steps:

- defibrillating the microfiber bundles of the at least one clay in water to form individualized microfibers (preparation step and defibrillation of the clay);
- dispersing the defibrillated clay in an organic or inorganic liquid solvent, until a stable clay gel is formed (step in which the clay is dispersed in liquid solvent);
- adding to the dispersion at least one modifying agent of the clay surface (step in which the clay is modified organically);
- removing the solvent from the clay dispersion by means of a solid-liquid separation method and/or a drying separation method (drying or solid/liquid separation step); and
- deagglomerating the compound until a powdered product is obtained (deagglomeration step), for example by means of grinding.

Clearly, a further object of the present invention is the method in question for producing the compound comprising at least one clay from the palygorskite-sepiolite group, as well as the use of said compound as a component, additive or filler for composite polymeric materials.

Basically, the aim of the first step for preparing the clay is to separate the structure of the microfiber bundles so as to substantially obtain individualized microfibers, without significantly affecting the aspect ratio of the microfibers, in order to expose and make the surface of the microfibers accessible for an absorption or reaction with the modifying agent. Subsequently, in a second phase, the defibrillated material resulting from the first step is dispersed in an organic or inorganic liquid, constituting the reaction medium, wherein it comes into contact with the modifying agent, in order to cover or modify the surface of the microfibers.

DETAILED DESCRIPTION

According to the invention, the at least one clay of natural origin used is preferably selected from the group consisting of sepiolite, attapulgite or a combination thereof, and mineral sepiolite and/or attapulgite. Pseudolaminar silicate preferably has a concentration higher than 50%, and better still higher than 85%, of at least one of clays, sepiolite or attapulgite or a combination thereof, or mineral sepiolite and/or mineral attapulgite, since contamination by other minerals such as calcite, dolomite, feldspar, mica, quartz or smectitein in these clays of natural origin, besides entailing a dilution of the pseudolaminar clay, it can also affect the final properties of the product and the development of the process itself.

Also preferably, the clay has an initial moisture content greater than 10%, and preferably is between 30% and 40%.

More preferably, the pseudolaminar silicate is a rheological grade product, which facilitates the step of obtaining a product of individualized or defibrillated clay prior to the dispersion in the liquid or solvent and to the organic modification.

The present invention includes, as non-limiting examples, natural mineral sepiolites and treated sepiolites, such as rheological grade sepiolite (marketed, for example, by TOLSA, S.A, Madrid, Spain) which are obtained from natural sepiolite using special wet micronization processes, which substantially prevent the fibers from breaking, described for example in patent applications EP-A-0170299 and EP 1690830, the sepiolite with metal particles or metal oxide particles (described in the international patent application PCT WO2005/035124), mineral or treated attapulgite, such as rheological grade attapulgite (for example the range of ATTAGEL products manufactured and marketed by Engelhard Corporation, the United States and Floridin Company's MIN-U-GEL range) or those obtained by treating attapulgite with the method described in patent EP-A-017299.

In one preferred embodiment, when the aim is to provide special properties or characteristics to the product to which the clay compound will be added as a filler or additive, the same being obtainable by means of the present method, such as a polymeric matrix, the pseudolaminar silicate contains metal particles, which more preferably are selected from the group consisting of V, Cr, Mn, Fe, Co, Ni, Cu and Sn. It is also preferable that the pseudolaminar silicate may contain oxide particles, most preferably selected from the group consisting of Y, Ti, V, Cr, Mn, Fe, Co, Cu, Zn, Al, Sn and Sb.

The essential steps of the method for producing the clay-based compound may preferably be performed sequentially (that is to say, one after the other, consecutively). Therefore, in one embodiment, the defibrillated clay, in the first step, is thereafter dispersed in the liquid solvent before the at least one modifying agent is added to modify the surface of the individualized microfibers of the at least one clay. In another preferred embodiment, the liquid solvent contains the at least one modifying agent, in such a way that the dispersion of the defibrillated clay with the liquid solvent and with the at least one modifying agent is performed simultaneously. Following this, the liquid solvent is removed after modifying the clay surface.

In a further preferred embodiment, the first defibrillation step comprises the use of a first modifying agent as an additive, which performs the functions of the dispersing agent, in order to facilitate the dispersion of the clay in a liquid solvent, into which one or other modifying agents are later added. This embodiment is especially indicated when the second modifying agent must be dissolved in an organic liquid solvent with low-polarity, a having a dielectric constant lower than 15 and, in particular, non-polar aprotic solvents of the aliphatic or aromatic hydrocarbon varieties, in which the individualized sepiolite microfibers are not easily dispersed given their hydrophilic character.

The first step of preparation and processing of the clay, called individualization or defibrillation, preferably consists of mechanical treatments, such as dispersion of the clay in water using dispersion systems at high shear or turbomixers; chemical treatments, such as using one or more dispersants, or both types of treatments. By systems at high shear dispersion is meant those capable of applying a high shear stress on the bundles of clay microfibers, enough to release and, therefore, individualize the microfibers of the bundles without breaking them. Suitable systems of high shear dispersion are impact mills of high speed or colloid mills with rotor-stator, capable of reaching a rotor peripheral speed of at least 15 m/s. In these systems, bundles of microfibers are subjected to a shear or cut stress, sufficient to produce defibrillation. Alternative systems are intensive mixers, double-zeta mixers or turbomixers with plow-shaped rotors, which can knead a mass of clay and water with a high concentration of clay, of at least 20%, so that at a not very high peripheral speed (5 m/s to 15 m/s) a high friction between particles is generated, friction that produces a tangential or cut stress sufficient to defibrillate the microfibre bundles.

With regard to mechanical methods, defibrillation preferably comprises a) dispersing the pseudolaminar silicate in water; and b) wet-grinding the dispersed substance. When this defibrillation step is performed using impact mills and high shear dispersion equipment, preferably capable of reaching peripheral velocities ranging between 15 m/s and 120 m/s and more preferably between 60 m/s and 100 m/s, in order to defibrillate the at least one clay of the silicate and to obtain an adequate particle size, the silicate may be dispersed in a concentration ranging between 0.5% and 20%, both limits included, more preferably between 1% and 10% both limits included. These percentages refer to weight in relation to the total weight of the mixture in water. When a high shear intensive mixer or turbo-mixer is used for grinding, such as for example double zeta mixers or mixers with plough shaped blades, the silicate is dispersed in a concentration ranging between 20% and 45% by weight, both limits included, per weight of the mixture in water. The mixing time in the intensive mixer ranges between 5 and 60 minutes, both limits included, and preferably between 10 and 30 minutes, both limits included. In this embodiment in which the defibrillation step is performed by means of intensive mixing, it may be combined with a chemical treatment, adding at least one dispersing agent, such as those described below. As already stated, in a variant of the preparation and defibrillation step for the at least one clay, one or various dispersing agents may be added in order to enhance the dispersion process thereof. Said dispersant or dispersants may be added in a percentage ranging between 0.1% and 7%, both limits included and more preferably between 0.3% and 5% by weight, as compared to the weight of the clay. Dispersing agents in this step, which are preferably adequate, in addition to the modifying agents employed in the method as mentioned above and described below, are inorganic polyelectrolytes, which are absorbed on the clay surface and produce electrostatic repulsion of the particles. Examples of inorganic polyelectrolytes are the alkaline salts of polyphosphoric, triphosphoric and hexametaphosphoric acids. Other dispersing agents may be phosphonics and phosphinics derivatives, such as diphosphonic acid and salts thereof. Bases such as sodium hydroxide, potassium hydroxide, ammonium hydroxide or sodium carbonate may also be added as dispersing agents, in the quantity necessary to increase the pH of the clay dispersion above pH 9 and preferably above pH 9.5.

The clay is preferably defibrillated until an average particle size smaller than 150 microns is obtained and, more preferably still, smaller than 44 microns and in the most preferable case, less than 15 microns, determined by laser diffraction.

Prior to the defibrillation step itself, the method may comprise a previous preparation step for the at least one clay, which preferably comprises grinding the pseudolaminar silicate, which also preferably has, in this case, a moisture lower than 40%, more preferably, it is ground until a particle size smaller than 10 mm is obtained and more preferably still, until a particle size smaller than 5 mm is obtained, before passing to the defibrillation step.

After defibrillation and before subjecting the at least one defibrillated clay to dispersion in a liquid solvent, the same may be subjected to drying and grinding steps, which may be sequential or simultaneous. More preferably, the defibrillated clay, before being dispersed in the liquid solvent, may be subjected to a classification process, for example with hydrocyclones, in order to separate the thickest clay fraction corresponding to microfibers aggregates which have not been completely individualized. The defibrillated clay obtained after the classification step is found in suspended form (with the water from the initial mixture) may be subjected to a subsequent solid/liquid separation process, for example by means of filtration, followed by a drying step, in order to eliminate residual water and a subsequent deagglomeration step by means of grinding a dry filter cake, which is formed, so as to obtain a powdered product that constitutes the individualized or defibrillated clay. Rather than filtration, drying and grinding processes like those set out, a direct, simultaneous drying and grinding step may be employed, by using special equipment, for example and without limitation "flash dryer" type mills, into which air or hot gases are introduced into the mill chamber in order to dry the product whilst it is ground or deagglomerated.

In order to make the clay surface more reactive, it may be necessary to perform a chemical or thermal treatment on the same, after the individualization or defibrillation step, but prior to the dispersion and the organic modification. Typical chemical treatments include treating the clay with acid in order to partially leach the silicate network of the sepiolite and attapulgite, with the aim of increasing the silanol groups on the surface, on which, for example, organic modifiers may be injected, such as silanes, which are capable of forming a covalent bond. In this case, mineral acids such as hydrochloric acid, sulfuric acid, nitric acid, phosphoric acid or combinations of these acids may be used. The acid treatment is preferably performed during the same first defibrillation or individualization step of the sepiolite in high shear water, before the defibrillated clay is dispersed in the liquid or solvent and the organic modifier is added. The quantity of acid used and the acid treatment time will be those adequate for leaching the Magnesium and Aluminum cations located in the octahedral layer of these clays, in a percentage between 0.1% and 20%, both limits included, of the initial content and preferably between 1% and 5%, both limits included.

Another type of clay treatment, which may be performed in addition to the essential steps of the method, after the individualization or defibrillation step and prior to the dispersion and organic modification, is a thermal treatment of the clay, with the aim of removing, for example, the water absorbed or the crystallization water from these pseudolaminar silicates and to facilitate the absorption or reaction of the organic modifying agent. The thermal treatment is performed at temperatures ranging between 100° C. and 600° C., both limits included and preferably, between 100° C. and 350° C., both limits included.

Regarding the dispersion step for the defibrillated clay in a liquid solvent, any of the products obtained in the preparation and defibrillation step may be used in any of their abovementioned variants, as well as sepiolite and attapulgite products previously treated in order to obtain rheological grade products more easily dispersed in water, such as those described in patent applications EP 0170299 and EP 1690830. These products are dispersed in liquid inorganic solvents such as water or organic solvents with high polarity, and a dielectric constant higher than 15, especially polar protic solvents used in dispersion equipment. The solid/liquid ratio, that is to say the clay/liquid solvent, may preferably range between 1:99 and 30:70, both limits included. More preferably, said ratio will range between 4:96 and 50:50, depending on the modifying agent used. The dosage of modifying agent in relation to 100 parts, by weight of the clay on a dry basis, expressed in millimoles, preferably ranges between 0.1 millimoles and 1,000 millimoles, more preferably between 1 millimole and 100 millimoles of modifying agent per 100 g of clay and more preferably between 2 millimoles and 50 millimoles of modifying agent per 100 g of initial clay. The composition in parts by weight varies depending on the molecular weight of the modifying agent but usually, the final modification grade of the modified clay is between 0.1 g and 30 g of modifying agent, both limits included, for every 100 g of clay. More preferably, it would be between 1 g and 20 g, both limits included, for every 100 g of clay. The inorganic liquid in which the defibrillated clay is dispersed in order to be modified is preferably water, in such a way that a stable aqueous clay gel is obtained. Water is also more suitable than organic liquids. The preferred organic liquids are organic liquids having a high polarity, with a dielectric constant higher than 15, and especially polar protic solvents, although organic liquids with low polarity and a dielectric constant smaller than 15 may also be used, provided that in the step in which the defibrillated or individualized clay is obtained, a first organic modifying agent is added as a dispersing agent, which facilitates the subsequent dispersion in the low-polarity organic liquid. Examples of organic liquids with low polarity include aliphatic or aromatic compounds such as aliphatic hydrocarbons, benzene, xylene and toluene.

As already mentioned, the organic or inorganic liquid may contain at least one of the modifying agents, with the aim of carrying out the surface modification, or either the modifying agent is added after the dispersion of the clay with the liquid solvent. The structure of the clay in the gel, with the fibers separated and established by the liquid, ensures that they are being covered rather than the aggregate of fibers, providing a product radically different from those obtained following other methods.

In order to disperse the clay in the liquid solvent, a dispersion equipment is preferably employed, for example an ultrasound equipment or preferably, mechanical high shear agitators. The use of mechanical agitation equipment that can provide a high shear higher than 10 m/s, and more preferably of at least 15 m/s, is preferable. A peripheral velocity ranging between 15 and 25 m/s is usually adequate. The time to prepare the dispersion may vary between 5 and 30 minutes and preferably between 10 and 20 minutes in order to obtain a dispersion or stable clay gel in the liquid or solvent.

In a preferred embodiment of the method, in which case the liquid or solvent wherein the modification of the clay is to be performed with the organic modifying agent is water, the dispersion of the individualized or defibrillated clay in water obtained in the first of the embodiments described above for the preparation and defibrillation step (the defibrillation grinding is performed with impact mills and high-shear dispersion equipments in order to defibrillate the clay and to obtain an adequate particle size) and which preferably has a particle size smaller than 44 microns and more preferably smaller than 15 microns, now constitutes a clay dispersion adequate to incorporate the organic modifying agent, cutting out the step of adding the liquid solvent and the additional solid/liquid separating and drying steps for the defibrillated clay before mixing it with the liquid solvent, in order to obtain a powdered product. When the liquid solvent is water, the organic modifying agent may be added under agitation, in order to facilitate a homogeneous distribution in the dispersion of the clay, preferably being agitated for a period between 5 and 60 minutes, both limits included and more preferably between 10 and 30 minutes, both limits included, at a peripheral velocity preferably higher than 10 m/s in order to achieve a uniform distribution of the organic modifier on the clay microfibers surface.

These technical considerations when the solvent is water are also applied to the case in which the liquid solvent is an organic liquid with high polarity.

When the liquid or solvent in which the surface modification of the clay to be performed is an organic liquid having a low polarity, the individualized clay or clay defibrillated in powder obtained in the individualization or defibrillation step, as indicated in any of the variants set out above, would tend to agglomerate when attempts are made to disperse in this medium, owing to the fact that the surface of these clays are very hydrophilic. In order to avoid this problem, a first organic modifying agent may be incorporated in the first clay individualization or defibrillation step in water as a dispersing agent, which makes the clay surface compatible with the liquid or organic solvent with low polarity wherein subsequent dispersion will take place and makes it possible to disperse the clay in this liquid or organic solvent with low polarity. Suitable dispersion conditions are the same as those discussed above in the case in which the defibrillated clay is dispersed in water (or other liquid or solvent of high polarity).

As far as the modification step of the previously defibrillated clay is concerned, when the modifying agent is added after the preparation and dispersion of the clay-liquid solvent, said addition may be made under agitation in order to achieve a homogeneous distribution of the modifying agent in the dispersion or clay gel. Although the agitation velocity in this case is not critical, provided that a homogeneous distribution is achieved, the use of high shear dispersion conditions is recommended, for example those employed in the preparation of the dispersion or clay gel, in order to ensure a correct homogenous dispersion of the modifier. The time and velocity of agitation should be adequate for making it possible to obtain a homogeneous dispersion and is usually necessary although not limiting or obligatory, to agitate for a period between 5 and 60 minutes, and more preferably between 10 and 30 minutes at a peripheral velocity of at least 10 m/s and preferably faster than 15 m/s.

Alternatively, the modifying agent may be added to the liquid or solvent before adding the clay, in order to perform both steps at the same time, that is to say, the dispersion of the clay in conjunction with the surface modification. Although heating the dispersion may increase the reaction rate for the modification of the clay surface, the modification does not usually need to be heated and can be performed at room temperature. Thus, rather than using one single organic modifier, a combination of organic modifiers of distinct natures may be employed with the aim of adjusting the nature of the surface modification of the clay in a more controlled way.

In a preferred embodiment, when the modified clay compound will subsequently be incorporated into a polymeric matrix, at least two organic modifiers may be employed, one of which makes the clay surface compatible with the polymeric matrix, such as a quaternary ammonium salt type modifier and another modifier capable of forming a covalent bond with the clay surface, which in addition, has a reactive group capable of reacting with the polymeric matrix with the aim of improving the force transmission of the polymeric matrix to the clay microfibers.

As mentioned, rather than using an organic modifying agent, a combination of organic modifiers, varying in nature, may be employed, in order to adjust the nature of the surface modification of the clay or clays in a more controlled way.

The at least one organic modifying agent (which may be one or more modifying agents) is at least a chemical compound with one portion or functional group capable of interacting and/or bonding with the clay surface and one organophilic portion or functional group, the latter being the one that should be compatible with the other components forming part of the polymeric matrix to which it will be incorporated as an additive or filler. The portion of the modifying compound capable of interacting with the clay surface may be selected from the group consisting of: one polar portion capable of being absorbed or forming hydrogen bonds on the clay surface, a positively charged group capable of being interchanged with inorganic cations on the clay surface, and a reactive group capable of reacting and forming a covalent bond with groups on the clay surface, such as silanol groups.

Actually, the modifying agent (or agents) is/are any substance(s) capable of modifying the polar nature of the surface of the previously prepared clay, reducing its polarity, or that functionalizes its surface, in all cases making it possible to make the at least one clay used as an additive or component compound compatible with the rest of the components of the same, for example the matrix comprising thermoplastic or thermostable polymers, object of interest in this application. The modifying agents may bond to the clay surface, depending on its chemical nature, by means of absorption, hydrogen bonds, electrostatic forces or covalent bond.

More specifically, in the case of the modifiers capable of bonding by means of electrostatic forces to the clay, the modifying agent may be selected from the quaternary ammonium salts and quaternary phosphonium salts families; in the case of the modifiers capable of being absorbed on the clay surface, the modifying agent may be selected from the families of compounds consisting of polyaminated compounds, polyglycols, silicone or siloxane oils, polydimethylsilaxanes, amines and polyamines. In addition, in the case of the compounds capable of reacting and forming a covalent bond with the clay surface, the modifying agent may be selected from the families of organometallic compounds, such as organosilates, organotitanates and organocirconates and any combination thereof.

In the event that the at least one modifying agent is a quaternary ammonium salt, the selection is therefore preferably made from the group consisting of salts of: alkyl trimethyl ammonium, alkyl dimethyl benzyl ammonium, dialkyl dimethyl ammonium, benzyl methyl dialkyl ammonium, alkyl dimethyl 2-ethylhexyl ammonium, and alkyl bis-2-hydroxyethyl methyl ammonium, and wherein the alkyl chain has at least 12 carbon atoms, and may be of natural origin such as tallow or hydrogenated tallow.

Also preferably, the phosphonic salt is selected from the group consisting of salts of trihexyl(tetradecyl)phosphonium, tributyl(tertadecyl)phosphonium, tetrabutyl phosphonium and tetra-n-octyl phosphonium.

Preferably, the polyglycol is selected from the group consisting of polyethylene glycol and polypropylene glycol.

Also preferably, the amine is selected from the group consisting of dimethyl alkyl amine, alkyl dimethyl aminopropylamine, bis-2-hydroxyethyl alkyl amine and N,N',N'-2-hydroxyethyl N-alkyl propylene diamine and wherein the alkyl chain has at least 12 carbon atoms and may be of natural origin such as tallow or hydrogenated tallow.

Preferably, the polyamine is selected from the group consisting of alkyl 1, 3, propylene diamine, alkyl dipropylene triamine and alkyl tripropylene tetramine and wherein the alkyl chain has at least 12 carbon atoms and may be of natural origin, such as tallow or hydrogenated tallow.

In the event that the at least one modifying agent is an organosilane, it is selected from the group consisting of: aminoalkyl trimethoxysilane, 3-aminopropyl-triethoxysilane, 3-aminopropyl-trimethoxysilane, vinyltriethoxysilane, vinyltrimethoxysilane, 3-methacryloxy propyl trimethoxysilane, methyltrimethoxysilane, methyltriethoxysilane, 3-mercaptopropyl trimethoxysilane, tetraethoxysilane, n-octyl-trimethoxysilane, n-octyl-triethoxysilane, n-hexadecyl trimethoxysilane, N-2-aminoethyl-3-aminopropyl trimethoxysilane, 3-glycidyloxypropyl trimethoxysilane, alkylamino-trimethoxysilane, acryloxypropyl trimethoxysilane, N-(2-aminoethyl)-3-aminopropyl-methyl dimethoxysilane, ketiminopropyl trimethoxysilane, 3,4-epoxy cyclohexyl ethyl trimethoxysilane and aminopropyl trimethoxysilane.

In the case of organometallic compounds, such as silanes, it is necessary to perform an activation step by hydrolysis, which may be catalyzed by acids or bases, before adding the modifying agent to the liquid solvent in order for it to react with the silanol groups of the clay microfibers surface.

After the organic modification step of the surface of at least one clay, the dispersion or gel of the already defibrillated and modified clay, obtained as described in any of the embodiments set out above, the liquid solvent removal step begins as well as the deagglomeration step (for example by grinding) of the final product. Said removal may preferably be performed by means of a solid/liquid separation step for example by means of filtration, followed by a drying step, after which the deagglomeration is initiated. These steps, both the liquid/solid separation and the drying and final deagglomeration, in any of the embodiments or variants of the essential method, object of the present invention, may be performed either sequentially or simultaneously.

Sequentially, the drying may be performed, for example with a fluid bed dryer, followed by deagglomeration in a mill with a dynamic or static classifier, in order to obtain a final powdered product of adequate size (preferably smaller than 44 microns and more preferably smaller than 15 microns). Furthermore, the drying and deagglomeration steps may be performed simultaneously using a special equipment, such as flash-dryer type mills into which hot air or gases are introduced into the grinding chamber in order to dry the product whilst it deagglomerates at the same time, controlling its size using an adequate classifier, until a preferable size smaller than 44 microns and more preferably less than 15 microns, is obtained. In this method, the final particle size of the modified clay compound in powdered form is not critical, although when specifying the highest dispersion grade possible in the product to which it will be incorporated as an additive or filler, such as a polymeric matrix, it is recommended and advantageous to use a powdered clay product with the smallest particle size possible. In this way, the modified pseudolaminar silicate may be conveniently added in powdered form with a preferred particle size smaller than 44 μm and more preferably less than 15 μm.

The clay compound obtained with individualized microfibers which have been modified at the surface according to the method described and to any one of its variants, presents the fundamental characteristic of the modifying agent being spread homogenously on the surface of the microfibers, preventing said microfibers from agglomerating after the drying step and facilitating the enhanced, easier incorporation into polymeric materials, thus obtaining a dispersion of microfibers homogeneously distributed in the polymer.

In conventional modification processes, particularly with silanes, the modification is performed in an organic medium. In this way, said modification does not take place on the individualized microfibers but rather on the external surface of the clay aggregates, given that the sepiolite is not dispersed correctly in the organic medium due to the hydrophilic character of its particles. The same problem arises when the modification reaction is performed in water without using an individualized or defibrillated clay which is dispersed in the water to form a gel or stable suspension, wherein the individual clay microfibers are separated, exposing its entire surface in order to interact with the modifying agent. To this end, the present invention presents a solution, which makes it possible to organically modify these clays, both in an aqueous medium and in an organic medium. Thus, the chemical modification of the fibers in gel, especially in aqueous gel, produces either the texturization of the surface of the fibers or the surface covering of the same, depending on the chemical structure and concentration of the modifying agent used, which impedes its reaglomeration and facilitates its dispersion in polymer matrices.

Likewise, the present invention makes it possible to modify the clay with one or various of the previously mentioned modifying agents, which is very advantageous. For example, combining various silanes facilitates a more complete covering of the surface and gives rise to an organoclay with a greater polymer compatibility margin. In this way, modification by means of various agents makes it possible to increase the hydrophobicity resulting from the fibers, which increases even further the usage possibilities with various matrices. Particularly, modifying the clay with a combination of silane agents with functional groups of various sizes makes it possible to modify the sepiolite and attapulgite fibers more completely and homogeneously, owing to the distinct size of the silanes which cover the surface and make it possible for the smaller silanes to cover areas of the surface of these clays which are left uncovered after the reaction with the larger silanes.

Furthermore, in contrast to the conventional organic modifications based on ammonium salts that are performed in laminar silicate type clays such as montmorillonite, in which the modifying agent is bound by means of electrostatic forces to the clay surface in order to enhance the dispersion in the polymer, the method, object of the present invention, makes it possible to make the surface of the sepiolite and/or attapulgite compatible with silane groups by means of covalent bonds, which gives rise to a greater interaction between the clay and the polymer, which in turn results in a more effective transmission of forces. Moreover, the described method, facilitates the conjoint modification of the clay with modifying agents varying in nature, such as silanes and quaternary ammonium salts, furthermore giving rise to an enhancement in the interaction between the clay and the polymer, which in turn is achieved with silane type modifiers with chains capable of reacting or interacting with the matrix, to an enhanced and more homogeneous dispersion in the polymeric matrix, which is usually achieved with modifiers such as quaternary ammonium type salts. The combination of both effects for improving the dispersion and the clay-polymer interactions, results in enhanced properties of the composite polymeric material, such as enhanced mechanical properties.

Using the techniques of the present invention described above, it is possible to obtain a product based on (which comprises) at least one clay with a high individualization grade of its individual particles or microfibers, and which has been organically modified and prepared to be incorporated as a component, additive or filler, into polymer matrices, with the aim of obtaining a clay-polymer composite, which enhances at least one of the following properties in comparison to the non-charged polymeric matrix: mechanical resistance, resistance to abrasion, thermal resistance, dimensional stability, surface finishing, gas barrier, liquid barrier, fire behavior, antibacterial behavior, antifungal behavior, bacteriostatic behavior, fungistatic behavior, superparamagnetic properties, ferromagnetic properties, pigmentation, surface plasmon, electric conductivity and catalytic properties. Another aim of this invention is therefore the product based on (which comprises) clay which may be obtained by means of the described method, in any of its variations. Said product incorporates each one of the methodological particularities described. In this sense, the final modification grade of the clay compound modified, expressed in millimoles of modifying agent per 100 grams of clay, ranges between 0.1 millimoles and 1000 millimoles, both limits included, preferably between 1 millimole and 100 millimoles of modifying agent per 100 g of clay, both limits included and, most preferably between 2 millimoles and 50 millimoles of modifying agent per 100 g of clay, both limits included. The composition in parts by weight varies depending on the molecular weight of the modifier but the final modification grade of the modified clay is usually between 0.1 g and 30 g of modifying agent, both limits included, for every 100 g of clay. More preferably, it would be between 1 g and 20 g, both limits included, for every 100 g of clay. It is also preferable that the clay-based compound is in powdered form and more preferably, with a particle size smaller than 44 µm, being more preferably smaller than 15 µm.

The present invention is also directed to the use of the abovementioned clay-based compound, in any of its variants, as an additive or filler in polymer, thermoplastic and thermostable matrices, as well as any composite material of polymeric matrix comprising said clay-based compound.

These composite polymeric materials are therefore characterized in that their inorganic portion is formed by microfibers or elemental clay fibers, with fiber lengths being those characteristic for the initial clay, which usually have an average size of 1 to 2 microns, since they are not broken during the process and they are homogenous on a submicrometric scale.

In a preferred embodiment, the composite polymeric material comprises at least one thermoplastic polymer selected from the group consisting of PA6, PA66, PA12, PET, PPT, PBT, LDPE, LLPE, PMMA, UVLDPE, HDPE, PP, TPOs, ABS, PC, EVA, PS, PVC and any other combination thereof. The abbreviations used to define the group of polymers correspond to the following polymer names:

PA6: polyamide 6
PA66: polyamide 66
PA12: polyamide 12
PET: polyethylene terephthalate
PPT: polypropylene terephthalate
PBT: polybutylene terephthalate
LDPE: low density polyethylene
LLPE: linear low density polyethylene PMMA: polymethylmethacrylate
UVLDPE: low density polyethylene UV resistant
HDPE: high density polyethylene
PP: polypropylene
TPOs: thermoplastic polyolefins
ABS: acrylonitrile-butadiene-styrene
PC: polycarbonate
EVA: ethylene vinyl acetate
PS: polystyrene
PVC: polyvinyl chloride In another preferred embodiment, the composite polymeric material comprises at least one thermostable polymer selected within the group formed by unsaturated polyesters, saturated polyesters, epoxy resins, bismaleimides, polyimides and acrylic resins, and any combination thereof.

Finally, a third possibility is that the polymeric matrix of the composite material comprises any combination of the thermoplastic and thermostable polymers set out above.

EXEMPLARY EMBODIMENTS OF THE INVENTION

Below are non-limiting examples of particular embodiments of the invention, which show the preferred preparation method for some of the claimed clay-based compounds; and both their individual properties and the properties of the composite polymeric materials to which they are incorporated as an additive or filler are analyzed, comparing them with other similar clay-based materials which are not obtained by the method, object of interest of this specification.

Example 1

Preparing Clay-Based Compounds from the Group of Pseudolaminar Silicates (Palygorskite-Sepiolite Group) According to the Method of the Present Invention and Using Water and a Modifying Agent A 4% by weight of the sepiolite concentration obtained from the method described in patent EP 0170299 is dispersed and defibrillated in water containing methyltrimetoxy silane (MMTS) in a ratio of 300 millimoles of silane per 100 grams of sepiolite. The silane was previously subjected to a hydrolysis process in an acid medium for 1 hour, preparing a silane dissolution in water at 10%, with 0.2% acetic acid being added. The clay dispersion with silane is agitated at high shear in a mechanical agitator at 12,000 rpm, at a peripheral velocity of 20 m/s, for 20 minutes. The dispersion is then filtered and the product dried in an oven at 100° C. overnight. Following this, the resulting sepiolite is purified by means of various wash cycles in dichloromethane, in order to remove the non-grafted silane and lastly, dried at 100° C., and ground down to 44 microns in size.

Figure 1:
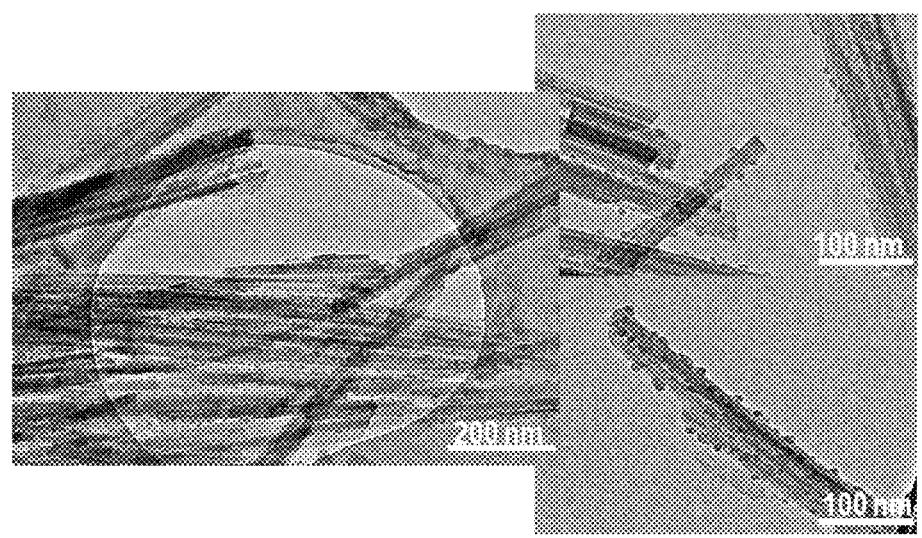
FIG. 1. Transmission electron microscopy of sepiolite fibers modified in an aqueous medium with methyltrimethoxysilane (MTMS) in a 300 millimoles concentration of reagent per 100 g of sepiolite, obtained in example 1 by the method described in the invention.

The resulting product is observed by means of the transmission electron microscopy (FIG. 1). It is possible to observe the silane covering the surface of the sepiolite microfibers homogenously, which produces the nano-texturization of the surface of the clay particles. The surface of the fibers is covered by condensed MTMS spheres with approximately 10 nanometers in diameter, there spheres being well distributed. This texturization drastically reduces the surface contact between fibers, thus preventing reagglomeration when they are dried, thereby facilitating their dispersion when they are incorporated into a polymeric material.

Example 2

Preparing Clay-Based Compounds by Means of a Modification in an Organic Solvent, Using a Conventional Method with Non-Defibrillated Sepiolite Sepiolite with a particle size smaller than 44 microns is dispersed at 4% in toluene, but is not subjected to an individualization or defibrillation process, the toluene containing 526 millimoles of methyltrimethoxy silane and 2 g of p-toluene sulfonic acid per 100 grams of sepiolite. It is placed in a three-mouthed flask with mechanical agitation at a peripheral velocity of 2.5 m/s and a Dean-Stark. The mixture is held at reflux for 2 hours. It is then filtered and washed with dichloromethane. The product is then dried at 100° C. and is ground down to a particle size smaller than 44 microns. The product identified as "MTMS-5.3-t" (FIG. 2 a) is therefore obtained.

Example 3

Preparing Clay-Based Compounds Using a Modification in Water Using a Conventional Method with Non-Defibrillated Sepiolite Sepiolite with a particle size smaller than 44 microns is dispersed in water, but is not subjected to an individualization or defibrillation process, the water containing aminopropyltrimethoxysilane (APTMS) in a ratio of 450 millimoles of silane per 100 grams of sepiolite, following the method described in example 1 but in this case, using low shear agitation with a peripheral velocity of 5 m/s. In this way, the product identified as "APTMS-4.5-w" (FIG. 2 b) is obtained.

Moreover, sepiolite with a particle size smaller than 44 microns is likewise dispersed, but it is not subjected to an individualization or defibrillation process, in water containing vinyltrimethoxysilane in a ratio of 530 millimoles of silane per 100 grams of sepiolite, following the method described above in this example. In this way, the product referred to as "VTMS-5.3-t" (FIG. 2 c) is obtained.

Example 4

Comparative Study of the Characteristics of the Clay-Based Compounds Obtained in Examples 2 and 3

Figure 2:
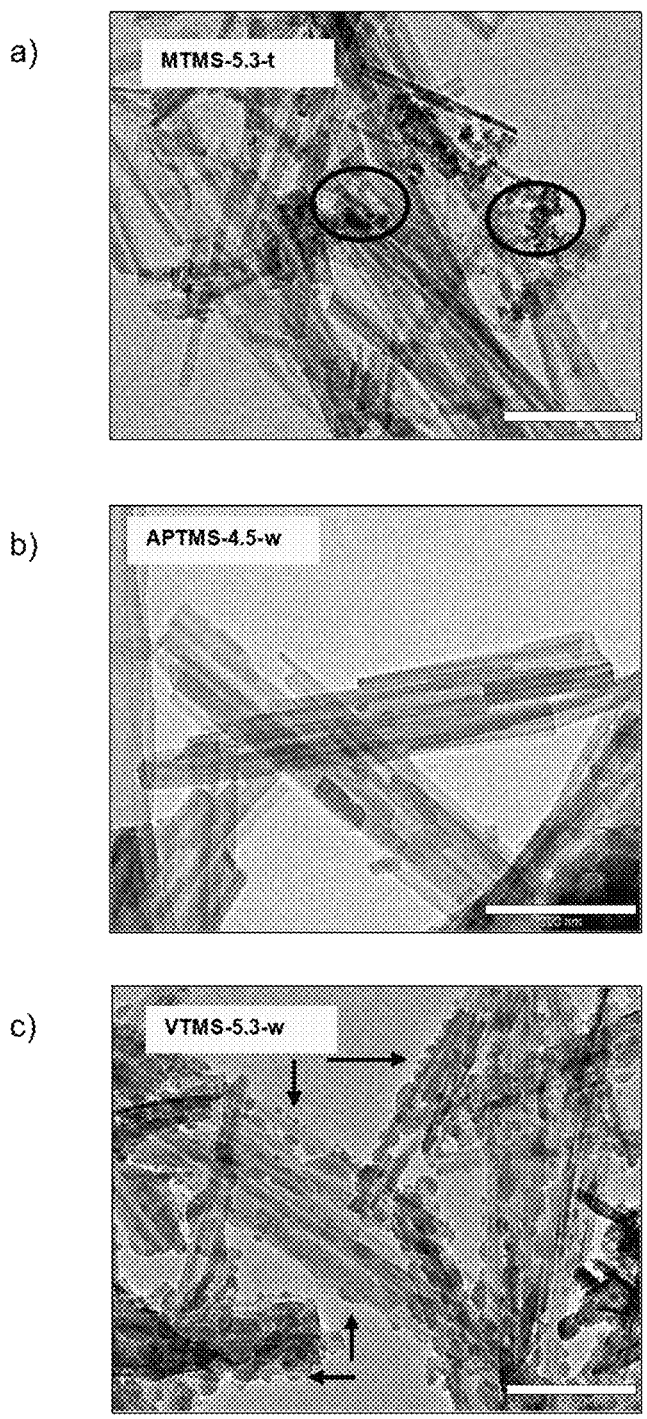
FIG. 2. Transmission electron microscopy (200 nm scale) of modified sepiolites using the conventional method, in toluene (a) and water (b), as described in examples 2 and 3, respectively and sepiolite modified following the method claimed in the present specification (c).

With the aim of comparing the products obtained in accordance with example 1, using the method of this invention and the products obtained in examples 2 and 3 using a conventional modification process, a microstructural study has been performed by means of a transmission electron microscopy (MET) as shown in FIGS. 1 (example 1) and 2 (examples 2 and 3). It is observed that none of the sepiolite products modified using a conventional method without individualizing the sepiolite microfibers results in the surface being covered homogeneously but rather, on the contrary, a heterogeneous distribution of the modifier with silane aggregates and a large percentage of the sepiolite fibers with the surface not being covered by the modifier is obtained (FIGS. 2 a and b). In contrast, the sepiolite defibrillated and modified following the method described in the patent, presents a homogeneous covering of the clay surface with MTMS and VTMS modifiers on the clay surface, as can be seen in FIGS. 1 and 2 c, respectively.

Figure 3:
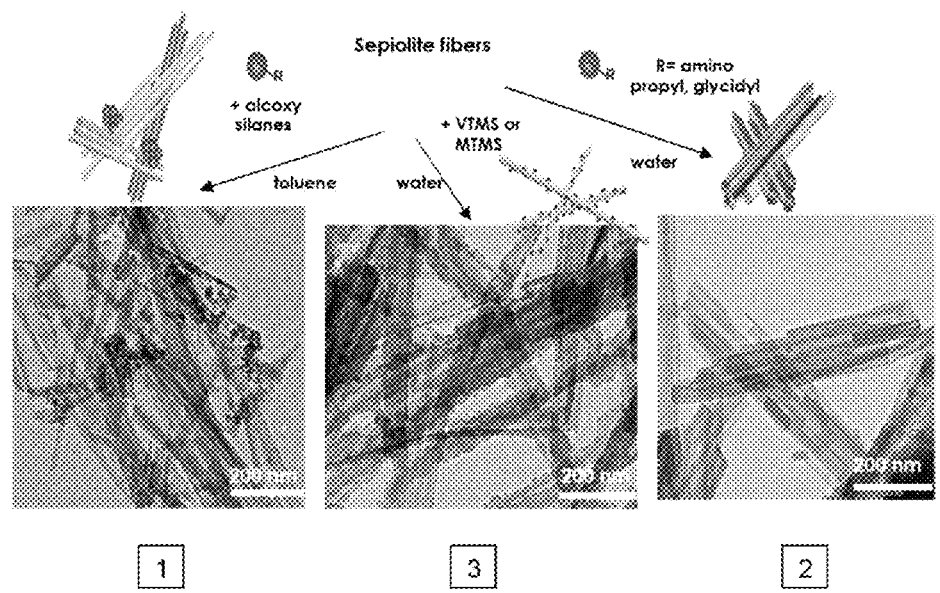
FIG. 3. Outline of the surface modifications made to the sepiolite using various modifying agents in the aqueous medium and in toluene using the conventional method (1 and 2) and in water using the method described in the invention (3).

The different effect obtained using the clay modification process described in this invention and the conventional methods are illustrated in FIG. 3, wherein processes 1 and 2 correspond to modification in water or toluene using conventional methods without defibrillating the clay and process 3 corresponds to the method of this invention, which defibrillates the clay.

Example 5

Incorporating the Clay-Based Compound Obtained in Example 1 in Polymer

Figure 4:
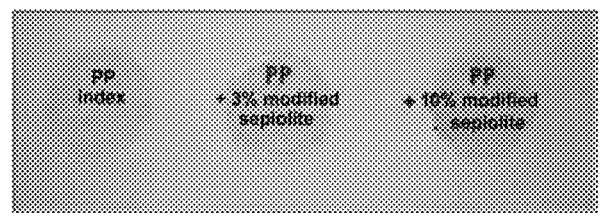
FIG. 4. Transparency of the films of polypropylene compound material and 3% and 10% of the modified sepiolite compound obtained in example 1, in comparison to polypropylene films without sepiolite.

The sepiolite compound modified with MTMS obtained in example 1 is dispersed in a thermoplastic polymer, polypropylene (PP), an internal mixer being used at 190° C. with a shear velocity of 40 rpm and a length of stay of 20 minutes. The quantity of sepiolite incorporated was 3% and 10% by weight of the PP weight. Using the composite polymeric material, films were prepared, as shown in FIG. 4, in comparison to a PP film, wherein sepiolite has not been added. It can be ascertained that the films containing sepiolite are more transparent despite the relatively high content of the added sepiolite compound. This shows a very good dispersion of the sepiolite microfibers in the polymeric matrix.

Example 6

Figure 5:
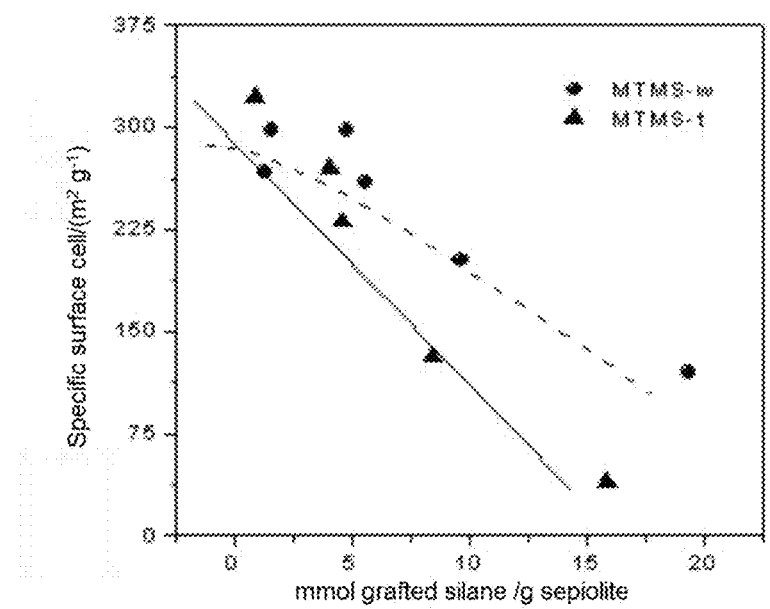
FIG. 5. a) Specific surface of modified sepiolites depending on the silane filler obtained in example 6c). b) Water behavior of several modified sepiolites with MTMS, where the different hydrophobic behavior can be observed.
Figure 5:
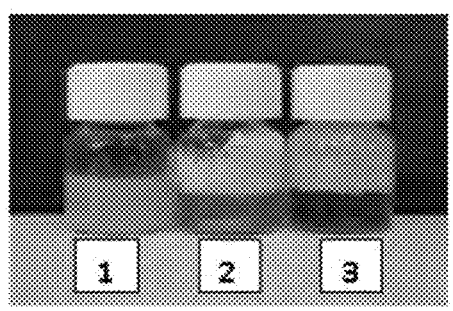

Effect of the Surface Modifications on the Specific Surface and Hydrophobicity of the Sepiolite Compounds Following the method described in example 1, various sepiolite compounds were prepared which were modified with various silanes, using water or toluene as a liquid or solvent. The compounds prepared were identified as follows:

MTMS-w: Sepiolite with methyltrimetoxysilane modified in water.
MTMS.t: Sepiolite with methyltrimetoxysilane modified in water
VTMS-W: Sepiolite with vinyltrimethoxysilane modified in water
MTMS-t: Sepiolite with vinyltrimetoxysilane modified in toluene
APTMS-w: Sepiolite with aminopropyltrimethoxysilane modified in water The silane quantities employed in the modification varied between 200 and 2,000 millimoles of silane per 100 grams of sepiolite. FIG. 5 shows the evolution of the specific BET surface, $N_2$ of the modified sepiolite depending on the quantity of silane deposited on the surface. It is possible to note that the silane covering reduces the specific surface, which varies depending on the reaction medium, on the quantity of silane and the chemical nature of the silane. This alternative covering of the surface and the different nature of the silane gives rise to sepiolite compounds with distinct hydrophobic characteristics, as can be ascertained when these compounds are dispersed in water (FIG. 5). The compounds with lesser coverage (preparation 1, FIG. 5 b) and a high specific surface over 200 $m^2/g$ still show hydrophilic behavior. In contrast, compounds (preparations 2 and 3) with a high level of coverage and a low specific surface (smaller than 100 $m^2/g$) show instead a highly hydrophobic behavior.

Controlling the hydrophobic character of these clay compounds is important so that they can be incorporated into composite polymeric materials thereafter.

Example 7

Comparing Low-Density Polyethylene (LDPE) Composite Materials and Modified Clay Compounds Obtained According to the Method Described in the Invention and a Conventional Method The dispersion and mechanical properties of low-density polyethylene-based (LDPE) composites were compared to sepiolite compounds prepared following the traditional method, using toluene as the reaction medium and following the method object of the invention, using a previous dispersion in water.

Figure 6:
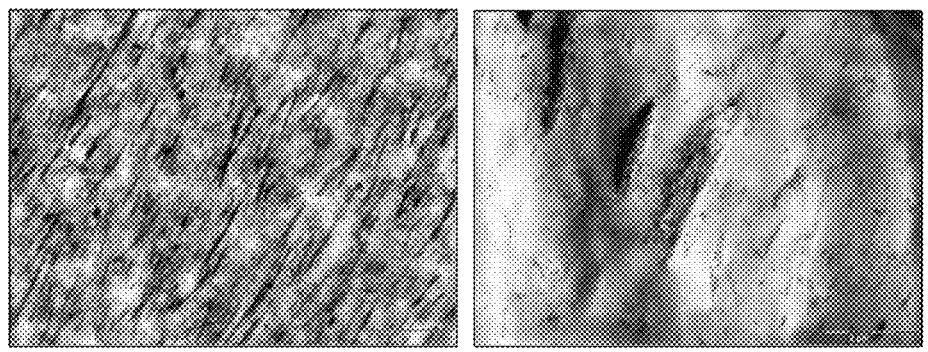
FIG. 6. Image from the transmission electron microscopy of sepiolite compounds modified in LDPE, obtained in example 7. On the left, the behavior obtained by mixing the sepiolite compound obtained using the method described in this invention is shown (example 1), whilst on the right the compound obtained by mixing with the modified sepiolite using a traditional method as described in example 2, is shown.

Following the method proposed in the invention, in accordance with example 1, a modified sepiolite compound is obtained with methyl trimethoxysilane. This sepiolite is dispersed at 5% by weight in a low-density polyethylene, in one single mixing step using a mini-extruder. On the other hand, a sepiolite modified with methyl trimethoxysilane is prepared in toluene following a conventional method, as described in example 2. This sepiolite modified according to a conventional method is dispersed at 5% by weight in a low-density polyethylene using a mini-extruder. In this case, owing to the lesser individualization and defibrillation of the sepiolite used, it is necessary to perform two dispersion steps in the low-density polyethylene. The compounds obtained can be seen in the transmission electron microscopy (FIG. 6). It can be clearly seen that the LDPE composite obtained with modified sepiolite, obtained following the process of this invention, gives a good dispersion of the sepiolite microfibers homogeneously distributed in the LDPE matrix, in addition, the sepiolite fibers maintain a high length/diameter ratio. In contrast, the compound obtained with the sepiolite obtained using a conventional method, which required two dispersion steps in the LDPE in order to obtain a homogeneous dispersion therein, shows that the sepiolite fibers have a very low length/diameter ratio owing to the fibers breaking when trying to mix the obtained sepiolite aggregates in toluene using the conventional method, which does not make it possible to individualize or defibrillate the sepiolite.

Figure 7:
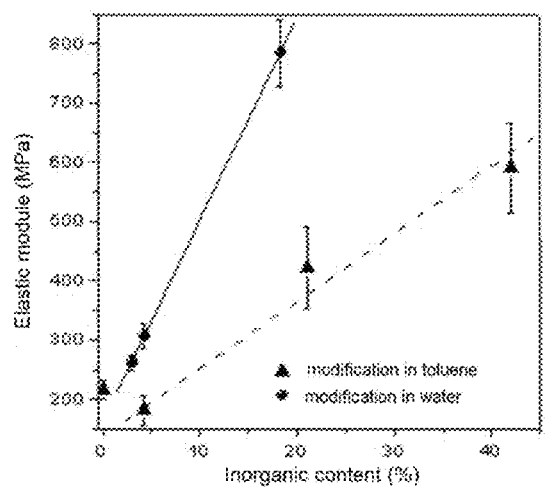
FIG. 7. Elastic module and rupture strain of the composite LDPE materials obtained in example 7. Triangular points correspond to the sepiolite compounds obtained in toluene using a conventional method and the circular points correspond to the sepiolite compounds with individualized fibers obtained, in accordance with the method described in this specification.
Figure 8:
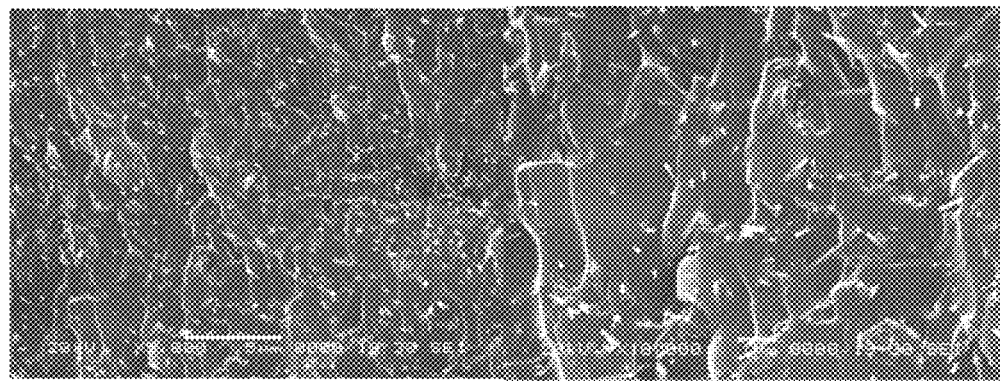
FIG. 8. Images from Scanning electron microscopy of the fracture area of plates manufactured with polyester resin based on a sepiolite compound modified with a silane (vinyltrimethoxysilane—VTMO) and a quaternary ammonium salt (dimethyl benzyl hydrogenated tallow ammonium chloride—B2MTH), at different magnifications.

As far as mechanical properties are concerned, the compounds prepared based on individualized sepiolite fibers, which have been organically modified following the method object of the present invention and those prepared based on sepiolite aggregates, which have been organically modified and obtained using toluene as a reaction medium, present different mechanical properties, as shown in FIG. 7. The increase in the elastic modulus, with equal sepiolite contents, is much greater in the case of sepiolite modified organically and obtained based on sepiolite with individualized fibers according to the method, object of this patent, than in the case of the organically modified sepiolite obtained in toluene using a conventional method.

Example 8

Effect of the Preparation Method of Sepiolite Compounds Modified with Aminoalkyl Silane According to the Invention, on Polyamide-6 Properties when they are Added as an Additive, as Compared with the Conventional Method Sepiolite with a particle size smaller than 44 microns is dispersed in water, but it is not subjected to an individualization or defibrillation process, the water containing aminoalkyl trimethoxysilane in a ratio of 3 millimoles of silane per 100 grams of sepiolite, following the method outlined in example 3, in order to obtain a sepiolite compound which has been modified following the conventional method. The compound obtained is identified as Sep 1-a.

On the other hand, defibrillated and individualized sepiolite obtained as described in patent application EP 0170299, is dispersed in water at 4% wherein aminoalkyl trimethoxysilane has previously been dispersed in a ratio of 3 millimoles of silane per 100 grams of sepiolite, following the method described in example 1, in order to obtain a sepiolite compound which has been modified by means of the method described in this patent, by dispersing the sepiolite in the silane solution. The sepiolite compound identified as Sep 1-b is thus obtained.

On the other hand, another compound obtained by dispersing defibrillated and individualized sepiolite is prepared, this sepiolite being obtained according to the method described in patent application EP 0170299, in water at 6%, using a mechanical agitator at 12,000 rpm, with a peripheral velocity of 20 m/s, for 10 minutes. An aqueous dissolution of aminoalkyl silane is then added to water in such a way that the sepiolite concentration in the final dispersion is 4% and there are 3 millimoles of silane per 100 grams of sepiolite. This dispersion is agitated using a mechanical agitator at 12,000 rpm, with a peripheral velocity of 20 m/s, for ten more minutes. Finally, the dispersion is filtered, dried at 100° C. and ground until a particle size smaller than 44 microns is obtained. In other words, in this case the sepiolite is previously dispersed in water at high shear before the modifying agent is added. The sepiolite compound identified as Sep 1-c is thus obtained.

The compounds Sep 1-a, Sep 1-b and Sep 1-c are added at 10% concentration to polyamide 6 (PA-6) and mixed in the polymer, melted at 250° C. using a double spindle extruder. With the compound materials in PA-6, obtained with each sepiolite compound, the mechanical properties are determined according to the UNE-EN-ISO 527 standards and the heat deflection temperature (HDT) is determined according to the UNE-EN-ISO 75 standard. In table 2, the results of the Young's modulus and HDT obtained for each compound material in comparison to the PA-6 into which sepiolite has not been added. It is possible to ascertain that greater increases in the module and HDT values are obtained with the sepiolite compound, obtained according to the method of the present invention. Furthermore, the Sep 1-c compound obtained by previously dispersing the defibrillated sepiolite in water at high shear before adding the modifying agent, makes it possible to obtain better results than those obtained with the Sep 1-b compound, which was prepared by directly dispersing the sepiolite in water containing silane. Both compounds, obtained from a defibrillated sepiolite, make it possible to obtain better results than those obtained using conventional, non-defibrillated sepiolite.

TABLE 2

Characterization of the compound materials of PA-6 with 10% of the sepiolite compounds obtained by modifying them with aminoalkyl silane, using a conventional method (Sep 1-a) and using the method described in this invention (Sep 1-b and Sep 1-c) obtained in example 10.

| Compound | Young's modulus (MPa) | % Increase of Young's Modulus | HDT (° C.) | % Increase of HDT |
| --- | --- | --- | --- | --- |
| PA-6 | 2,730 | — | 64 | — |
| PA-6 + Sep 1-a | 5,890 | 115 | 125 | 95 |
| PA-6 + Sep 1-b | 6,190 | 127 | 139 | 116 |
| PA-6 + Sep 1-c | 7,090 | 160 | 147 | 128 |

Example 9

Effect of the Preparation Method of Sepiolite Compounds Modified Using 3-Methacryloxy Propyl Trimethoxysilane, on the Properties of Polyamide-6 when Added as an Additive, According to the Invention, as Compared with the Conventional Method Three sepiolite compounds modified with silane are prepared as described in example 8, the only difference being that in this case, 3-methacryloxy propyl trimethoxysilane is used as a silane, 8 millimoles of silane being used per 100 grams of sepiolite. The following compounds are thus obtained:

Sep 2-a: obtained using a conventional method, using non-defibrillated sepiolite.

Sep 2-b: obtained from defibrillated sepiolite using a method described in the present invention, wherein the sepiolite is dispersed at high shear in the silane solution.

Sep 2-c: obtained from defibrillated sepiolite using a method described in the present invention, wherein the sepiolite is firstly dispersed at high shear in water before the silane dissolution is added.

As in example 8, these three compounds are added at 10% concentration into polyamide-6 (PA-6) and are mixed with the polymer melted at 250° C. using a double spindle extruder. The compound materials in PA-6 are characterized as indicated in example 10. The results obtained are summarized in Table 3. It can be ascertained that, as is the case in example 10, the highest module increases and HDT values are obtained with the sepiolite compound obtained using the method of the present invention. Furthermore, the Sep 2-c compound obtained by previously dispersing the defibrillated sepiolite in water at high shear before adding the modifying agent, makes it possible to obtain better results than those obtained with the Sep 2-b compound, prepared by dispersing the sepiolite directly in water containing silane. Both compounds, obtained from defibrillated sepiolite, make it possible to obtain better results than those obtained with conventional, non-defibrillated sepiolite.

TABLE 3

Characterization of the compound materials of PA-6 with 10% sepiolite compounds obtained by 3-methacryloxy propyl trimethoxysilane modification, using a conventional method (Sep 2-a) and using the method described in this invention (Sep 2-b and Sep 2-c) obtained in example 8.

| Compound | Young's modulus (MPa) | % increase of Young's modulus | HDT (° C.) | % increase of HDT |
|---|---|---|---|---|
| PA-6 | 2,730 | — | 64 | — |
| PA-6 + Sep 2-a | 5,330 | 95 | 128 | 98 |
| PA-6 + Sep 2-b | 5,860 | 115 | 131 | 103 |
| PA-6 + Sep 2-c | 6,500 | 138 | 147 | 128 |

Example 10

Figure 9:
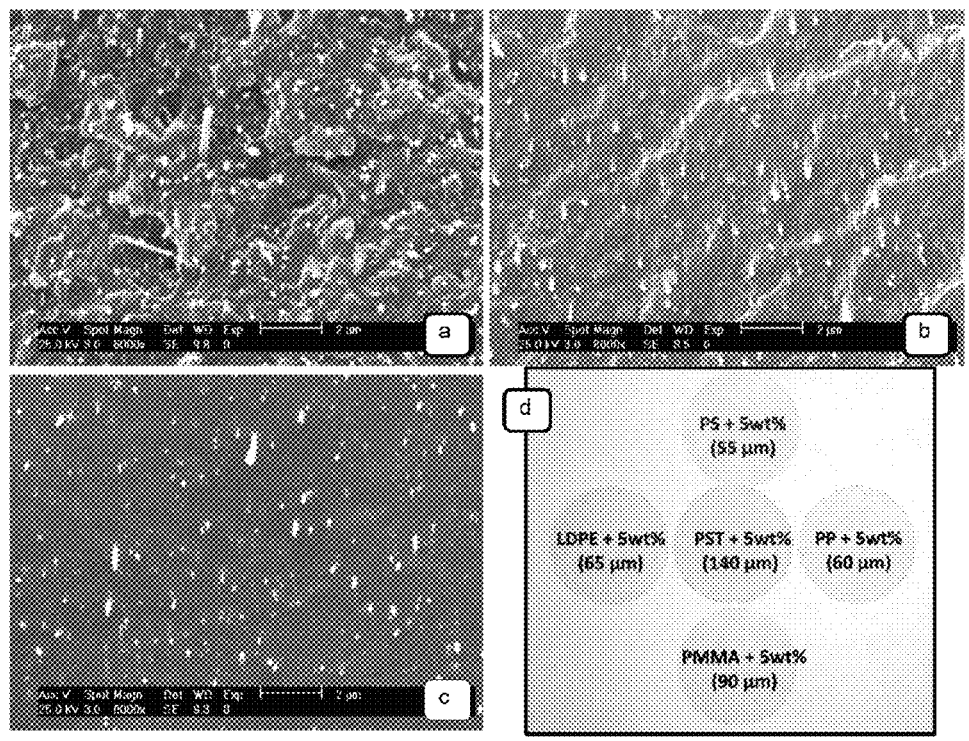
FIG. 9. Scanning electron microscopy of the modified sepiolite compound incorporated at 5% into different polymers, as indicated in example 10: a) polyester resin, b) LDPE and c) polystyrene. d) Transparency of the films prepared in FIGS. 9 a, b and c and of the compound material obtained from a 5% of modified sepiolite dispersed in PMMA and PP.

Preparing Compound Materials Based on Modified Sepiolite, Obtained Using the Invention and Based on Various Polymers The individualized sepiolite, modified with methyltrimethoxysilane and prepared in accordance with example 1, is dispersed at 5% concentration, in various polymers: polyester resin, epoxy resin, polypropylene (PP), low-density polyethylene (LDPE), polystyrene (PS) and polymethyl methacrylate (PMMA). This set of polymers includes thermoplastic materials processed by melting (PMMA) and extrusion (LDPE and PS) and cured thermostables (polyester and epoxy resin), that is to say, all of them obtained via traditional industrial processes. FIG. 9 a-c contains photos of a scanning electron microscopy of the compounds obtained in polyester resin, LDPE and polystyrene, wherein it is possible to observe the optimal modified clay dispersion in these polymers. As it can be seen, there are no large micrometric aggregates but rather isolated fibers. In FIG. 9 d, thick films (55-140 µm) of the sepiolite compounds are shown in polystyrene, PP, LDPE, and PMMA, from which it can be ascertained that these materials exhibit high transparency, which shows the good dispersion of sepiolite in the various polymer matrices.

Example 11

Preparing a Sepiolite Compound Modified with a Quaternary Ammonium Salt and Silane The compound is dispersed at 45% by weight of sepiolite concentration, obtained following the method described in patent application EP 017299 and defibrillated in water in an intensive turbo-mixer with a peripheral velocity of 11 m/s, over ten minutes. Following that, previously hydrolyzed vinyltrimethoxysilane is added in a ratio of 3.4 millimoles per 100 grams of sepiolite and is mixed for ten minutes in the turbo-mixer. Dimethyl benzyl hydrogenated tallow ammonium chloride is then added in a ratio of 30 millimoles per 100 grams of sepiolite and is agitated for another ten minutes. The mixture is dried at 150° C. before being ground down to a particle size smaller than 45 microns. The modified sepiolite compound obtained is then dispersed at 15% concentration in styrene using a high shear Cowles-type agitator for ten minutes, at a peripheral velocity of 20 m/s. The dispersion of the sepiolite compound in styrene obtained is added to Norsodyne M01510 polyester resin, supplied by Cray Valley, in a quantity such that the final concentration of the sepiolite compound is 4% and it is dispersed at high shear in a calendar system with refrigerated rolls in order to prevent the styrene from evaporating, passing through the rollers successive times whilst reducing the distance between rollers from 50 to 5 micron, with a roller velocity of 350 rpm. Once the polyester resin has been added to the sepiolite compound, a traditional pre-peg containing mineral fillers and glass fibers is made, in such a way that the percentage of the sepiolite compound in the final pre-peg was 0.45%. The pre-peg is then processed by means of sheet molding compound (SMC) in order to obtain from the laminate hot pressing plates. Likewise, plates were obtained but without adding sepiolite compound to the polyester resin. These plates were tested in order to determine their mechanical properties in Charpy flexion and impact trials. The results are shown in Table 1. As can be seen, the laminate obtained shows a notable enhancement in resistance, modulus and average tenacity, according to the Charpy impact test.

TABLE 1

Mechanical characterization derived from Charpy flexion and impact trials on the plates obtained from polyester resin and polyester resin with the sepiolite compound obtained in example 9.

| | Flexion test | | Charpy impact |
|---|---|---|---|
| | Resistance (MPa) | Modulus (MPa) | test Tenacity (KJ/m2) |
| Polyester resin | 107.8 ± 20.8 | 8,639.4 ± 683 | 53.9 ± 4.2 |
| Polyester resin + 4% VTMO/B2MTH) | 128.3 ± 30.3 | 9,176.5 ± 947 | 65.3 ± 12.2 |
| Increase (%) | 19 | 6 | 21 |

The invention claimed is:

1. A method for producing a compound comprising a pseudolaminar silicate, which is at least one clay of the palygorskite-sepiolite group, wherein the method comprises at least the following steps:
- defibrillating the microfiber bundles of the at least one clay into individualized microfibers with an average size smaller than 15 microns by means of a mechanical treatment which comprises dispersing the pseudolaminar silicate in water and wet-grinding the dispersion using a device selected from:
  - an impact mill or high shear dispersion equipment, in such a way that the clay is dispersed in water at a concentration ranging between 0.5% and 20%, and the grinding process is carried out at a peripheral velocity ranging between 15 m/s and 120 m/s, both limits included; or
  - a device selected from an intensive mixer or a turbo-mixer, in such a way that the clay is dispersed in water at a concentration ranging between 20% and 45%, and the grinding process is carried out at a peripheral velocity ranging between 5 m/s and 15 m/s for between 5 and 60 minutes, both limits included;
- subjecting the clay to a classification process in order to separate the fraction of clay into aggregates of individualized fibers;
- dispersing the individualized fibers of the defibrillated clay in an organic or inorganic liquid solvent, until a stable clay gel is formed;
- adding to the dispersion at least one modifying agent of the clay surface;
- removing the solvent from the clay dispersion by means of a solid-liquid separation method and/or a drying separation method; and
- deagglomerating the final compound until a powdered product is obtained.

2. The method according to claim 1, wherein the at least one clay is selected from the group consisting of sepiolite, attapulgite, a combination thereof, a sepiolite mineral, an attapulgite mineral and a combination of both minerals.

3. The method according to claim 1, wherein the pseudolaminar silicate is a rheological grade product.

4. The method according to claim 1, wherein the pseudolaminar silicate has a concentration higher than 50% of at least one of the clays.

5. The method according to claim 1, wherein the pseudolaminar silicate contains metal particles.

6. The method according to claim 5, wherein the metal particles are selected from the group consisting of V, Cr, Mn, Fe, Co, Ni, Cu and Sn.

7. The method according to claim 1, wherein the pseudolaminar silicate contains oxide particles.

8. The method according to claim 7, wherein the oxide particles are selected from the group consisting of Y, Ti, V, Cr, Mn, Fe, Co, Cu, Zn, Al, Sn and Sb.

9. The method according to claim 1, wherein the dispersion of the clay in the liquid solvent and the addition of the at least one modifying agent are carried out simultaneously, said liquid containing the at least one modifying agent.

10. The method according to claim 9, wherein the defibrillation of the clay, its dispersion in the liquid solvent and the addition of the at least one modifying agent are carried out simultaneously.

11. The method according to claim 1, wherein the removal of the solvent and the deagglomeration of the final compound are carried out simultaneously.

12. The method according to claim 1, wherein the defibrillation of clay in water is carried out, in addition, by means of a chemical treatment.

13. The method according to claim 1, wherein the chemical treatment is performed using at least one dispersing agent.

14. The method according to claim 13, wherein the at least one dispersing agent is selected from the group consisting of inorganic polyelectrolytes, phosphonic derivatives, phosphinic derivatives and bases.

15. The method according to claim 1, wherein after the defibrillation step and before the dispersion step in the liquid solvent, the at least one defibrillated clay is dried and ground.

16. The method according to claim 1, wherein after being classified, the defibrillated clay is subjected to a solid-liquid separation step, a drying step and a grinding step.

17. The method according to claim 1, wherein after being classified, the defibrillated clay is simultaneously subjected to a drying step and a grinding step.

18. The method according to claim 1, further comprising a step for the thermal treatment of the clay before modifying the clay with the modifying agent.

19. The method according to claim 1, wherein the clay/liquid solvent ratio in the dispersion is between 1:99 and 70:30, both limits included.

20. The method according to claim 1, wherein the clay/liquid solvent ratio is between 4:96 and 50:50, both limits included.

21. The method according to claim 1, wherein the liquid inorganic solvent is water.

22. The method according to claim 21, wherein the water in the clay defibrillation step is the liquid solvent in which the defibrillated clay is dispersed, in such a way that the clay and water dispersion prepared for the defibrillation is in turn, both the defibrillated clay dispersion and the liquid solvent into which, after said defibrillation, the modification agent is added.

23. The method according to claim 1, wherein the organic liquid solvent is a low polarity organic liquid solvent.

24. The method according to claim 23, wherein the low polarity organic liquid solvent is an aromatic or aliphatic hydrocarbon.

25. The method according to claim 24, wherein the aromatic hydrocarbon is selected from the group consisting of benzene, xylene and toluene.

26. The method according to claim 23, wherein at least one of the modifying agents is added as a dispersing agent in the step of defibrillation in water of the at least one clay.

27. The method according to claim 1, wherein the dispersion process is performed using one of the devices selected from the group consisting of ultrasound equipment and high shear mechanical agitation equipment.

28. The method according to claim 1, wherein the at least one modifying agent is a chemical compound or molecule with one portion that binds to the clay surface and another organophilic portion which is compatible with organic compounds.

29. The method according to claim 28, wherein the portion of the modifying agent which is bound to the clay surface is selected from the group consisting of a polar group capable of forming hydrogen bonds or being absorbed on the clay surface, a positively charged group capable of being interchanged with inorganic cations on the clay surface and a reactive group capable of reacting and forming a covalent bond with groups on the clay surface.

30. The method according to claim 28, wherein the modifying agent is selected from the group consisting of quaternary ammonium salts, quaternary phosphonic salts, polyaminated compounds, polyglycols, silicone oils, polydimethylsiloxanes, organometallic compounds, amines and polyamines and any combination thereof.

31. The method according to claim 30, wherein the organometallic compound is selected from the group consisting of organosilanes, organotitanates and organozirconates and any combination thereof.

32. The method according to claim 31, wherein the organosilane compound is selected from the group consisting of: 3-aminopropyl-triethoxysilane, 3-aminopropyl-trimethoxysilane, vinyltriethoxysilane, vinyltrimethoxysilane, 3-methacryloxy propyl trimethoxysilane, methyltrimethoxysilane, methyltriethoxysilane, 3-mercaptopropyl trimethoxysilane, tetraethoxysilane, n-octyl-trimethoxysilane, n-octyl-triethoxysilane, n-hexadecyl trimethoxysilane, N-2-aminoethyl-3-aminopropyl trimethoxysilane, 3-glycidyloxypropyl trimethoxysilane, alkylamino-trimethoxysilane, acryloxypropyl trimethoxysilane, N-(2-aminoethyl)-3-aminopropyl-methyl dimethoxysilane, ketiminopropyl trimethoxysilane, 3,4-epoxy cyclohexyl ethyl trimethoxysilane and aminopropyl trimethoxysilane.

33. The method according to claim 30, wherein the quaternary ammonium salt is selected from the group consisting of salts of alkyl trimethyl ammonium, alkyl dimethyl benzyl ammonium, dialkyl dimethyl ammonium, benzyl methyl dialkyl ammonium, alkyl dimethyl 2-ethylhexyl ammonium, and alkyl bis-2-hydroxyethyl methyl ammonium, and wherein the alkyl chain has at least 12 carbon atoms, and may be of natural origin such as tallow or hydrogenated tallow.

34. The method according to claim 30, wherein the phosphonic salt is selected from the group consisting of salts of trihexyl (tetradecyl) phosphonium, tributyl (tertadecyl) phosphonium, tetrabutyl phosphonium or tetra-n-octyl phosphonium.

35. The method according to claim 30, wherein the polyglycol is selected from the group consisting of polyethylene glycol and polypropylene glycol.

36. The method according to claim 30, wherein the amine is selected from the group consisting of dimethyl alkyl amine, alkyl dimethyl aminopropylamine, bis-2-hydroxyethyl alkyl amine and N,N',N'-2-hydroxyethyl N-alkyl propylene diamine, and wherein the alkyl chain has at least 12 carbon atoms and may be of natural origin such as tallow or hydrogenated tallow.

37. The method according to claim 30, wherein the polyamine is selected from the group consisting of alkyl 1, 3, propylene diamine, alkyl dipropylene triamine and alkyl tripropylene tetramine, and wherein the alkyl chain has at least 12 carbon atoms and may be of natural origin, such as tallow or hydrogenated tallow.

38. The method according to claim 1, wherein the deagglomeration process is carried out by mechanical means.

39. The method according to claim 1, wherein the final compound is deagglomerated to a particle size smaller than 44 μm.

40. The method according to claim 39, wherein the final compound is deagglomerated to an average particle size smaller than 15 μm.

* * * * *